US011084691B2

(12) United States Patent
Palberg et al.

(10) Patent No.: US 11,084,691 B2
(45) Date of Patent: Aug. 10, 2021

(54) CRANE

(71) Applicant: Liebherr-Components Biberach GmbH, Biberach an der Riß (DE)

(72) Inventors: Michael Palberg, Riedlingen (DE); Jürgen Resch, Degernau (DE); Oliver Fenker, Warthausen (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 351 days.

(21) Appl. No.: 16/091,995

(22) PCT Filed: Apr. 6, 2017

(86) PCT No.: PCT/EP2017/000436
§ 371 (c)(1),
(2) Date: Oct. 7, 2018

(87) PCT Pub. No.: WO2017/174196
PCT Pub. Date: Oct. 12, 2017

(65) Prior Publication Data

US 2019/0112165 A1 Apr. 18, 2019

(30) Foreign Application Priority Data

Apr. 8, 2016 (DE) ..................... 10 2016 004 249.4
Apr. 11, 2016 (DE) ..................... 10 2016 004 350.4

(51) Int. Cl.
*G06F 7/00* (2006.01)
*B66C 13/06* (2006.01)
*B66C 13/48* (2006.01)

(52) U.S. Cl.
CPC ............ *B66C 13/063* (2013.01); *B66C 13/48* (2013.01)

(58) Field of Classification Search
USPC .......................................... 700/213, 228–229
See application file for complete search history.

(56) References Cited

U.S. PATENT DOCUMENTS 4,172,685 A * 10/1979 Nabeshima ............. B66C 13/46 212/276
5,806,696 A * 9/1998 Hytonen ................ B66C 13/54 212/270

(Continued)

FOREIGN PATENT DOCUMENTS

| | | |
|---|---|---|
| CN | 101704472 | 5/2010 |
| DE | 10064182 | 5/2002 |

(Continued)

OTHER PUBLICATIONS

Search Report from Application No. 2018139050 dated Jun. 18, 2020 (2 pages).

(Continued)

*Primary Examiner* — Yolanda R Cumbess
(74) *Attorney, Agent, or Firm* — Troutman Pepper Hamilton Sanders LLP; Ryan A. Schneider

(57) ABSTRACT

The present invention relates to a tower crane with a load lifting means mounted on a hoisting cable, driving devices for moving several crane elements and traversing the load lifting means, and a control device for controlling the driving devices such that the load lifting means moves along a traversing path between at least two target points. The control device has a traversing path determining module for determining a desired traversing path between the at least two target points and an automatic traversing control module for automatically traversing the load lifting means along the determined traversing path.

25 Claims, 7 Drawing Sheets

(56) References Cited

U.S. PATENT DOCUMENTS

| | | | | |
|---|---|---|---|---|
| 2012/0234787 | A1 | 9/2012 | Ueda et al. | |
| 2013/0161279 | A1 | 6/2013 | Schneider et al. | |
| 2013/0345857 | A1 | 12/2013 | Lee et al. | |
| 2016/0034730 | A1 * | 2/2016 | Delplace | G01S 19/13<br>340/8.1 |
| 2016/0035251 | A1 * | 2/2016 | Delplace | G09B 19/003<br>434/66 |
| 2018/0155159 | A1 * | 6/2018 | Barbet | B66C 23/905 |

FOREIGN PATENT DOCUMENTS

| | | | | |
|---|---|---|---|---|
| DE | 10064182 | A1 * | 5/2002 | B66C 13/085 |
| DE | 000010064182 | A1 | 5/2002 | |
| DE | 102004045749 | A1 | 4/2006 | |
| DE | 102005002192 | | 7/2006 | |
| DE | 102005002192 | A1 | 7/2006 | |
| DE | 102007041692 | A1 | 3/2009 | |
| DE | 102009016366 | A1 | 12/2009 | |
| DE | 102011001112 | A1 | 9/2012 | |
| DE | 102012004739 | A1 | 9/2013 | |
| DE | 102013006258 | A1 | 10/2014 | |
| DE | 102013012019 | A1 | 1/2015 | |
| RU | 2403204 | | 11/2010 | |
| WO | 2015045521 | A1 | 4/2015 | |

OTHER PUBLICATIONS

Office Action from Application No. RU2018139050 dated Jun. 18, 2020 (4 pages).

Schaper, U., et al. "A Load Position Observer for Cranes With Gyroscope Measurements," XP002771861; Database Compendex [Online], Engineering Information, Inc., New York, NY, US, 2011; Database Accession No. E20124015493306; & IFAC Proceedings Volumes (IFAC—Papersonline)—Proceedings of the 18th IFAC World Congress 2011 IFAC Secretariat AUS Bd. 18, Nr. Part 1, 2011, Seiten 3563-3568, DOI: 10.3182/20110828-6-IT-1002.01456, 1 page.

Search Report of DE Application No. 102016004350.4 dated Jan. 25, 2017, 9 pages.

Search Report of DE Application No. 102016004249.4 dated Jan. 30, 2017, 9 pages.

International Search Report and Written Opinion for International Application No. PCT/EP2017/000436 , dated Jul. 25, 2017, 14 pages.

Office Action from Indian Application No. 201817037132 dated Jan. 18, 2021 (7 pages).

* cited by examiner

CRANE

CROSS-REFERENCE TO RELATED APPLICATIONS

This application is a § 371 national stage of International Application PCT/EP2017/000436, with an international filing date of 6 Apr. 2017, which International Application claims the benefit of DE Patent Application Serial Nos. 10 2016 004 249.4 filed on 8 Apr. 2016 and 10 2016 004 350.4 filed on 11 Apr. 2016, the benefit of each of the earlier filing dates hereby claimed under 35 USC § 119(a)-(d) and (f). The entire contents and substance of all applications are hereby incorporated by reference.

STATEMENT REGARDING FEDERALLY SPONSORED RESEARCH OR DEVELOPMENT

Not Applicable

THE NAMES OF THE PARTIES TO A JOINT RESEARCH AGREEMENT Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

The present invention relates to a crane, in particular a tower crane, and crane control of a load lifting means mounted on a hoisting cable along a traversing path between at least two target points.

2. Description of Related Art

Tower cranes generally include a base, a tower and a slewing unit. The base is bolted to a large concrete pad that supports the crane. The base connects to the tower/mast, which gives the tower crane its height. Attached to the top of the tower is the slewing unit—the gear and motor—that allows the crane to rotate.

Generally located on top of the slewing unit are a boom (a long horizontal jib or working arm), a counter-boom (a shorter horizontal machinery arm), and the operator's cab. The boom is the portion of the crane that carries the load. A trolley runs along the boom to move a load in and out from the crane's center. The counter-boom contains the crane's motors and electronics as well as counter weights.

The boom together with the counter-boom can rotate by the slewing unit about an upright axis of rotation, which can be coaxial to the tower axis. The trolley can traverse the boom by a trolley drive. A load hook for carrying the load is attached to the trolley via a hoisting cable.

Tower cranes are used to aerially move loads from one point to another. Through a variety of mechanisms, a load it typically secured to the load hook at a first target point—a starting location—and moved to a second target point a destination location—where the load is removed/dumped.

The three dimensional space available to the traversing path of the load is generally defined by the height of the tower, the length of the boom, and the rotation of the boom about the tower. Obstacles in that available volume might limit a most direct (shortest) traversing path from the starting location to the destination location.

To lift, lower and rotate the position of load hook, the interplay of the slewing unit, trolley drive, the hoisting gear, the hoisting cable must each be actuated and controlled. These exemplary driving devices usually are actuated and controlled by the crane operator via corresponding control elements in the operator's cab, including joysticks, toggle switches or rotary knobs and the like. These types of control elements require significant feel and experience of the operator in order to approach target points quickly and gently without major pendular movements of the load hook. Movements between the target points should be as fast and gentle as possible.

Controlling the various driving devices of a crane can be tedious for the crane operator as they require significant concentration. Operator tasks include recurring traversing paths and repetitive monotonous tasks, such as during concreting operations. For instance, during contrasting, repetitive tasks include moving a concrete bucket suspended on the crane hook to and fro between the starting location (a concrete mixer), where the concrete bucket is filled, and the destination location (a concreting area), where the concrete bucket is emptied.

An inexperienced operator, or one whose concentration is waning, might allow major pendular movements of the lifted load without notice or experience on how to limit, and those pendular movements can be hazardous.

Based on this context, an object of the present invention is to provide an improved tower crane that avoids the disadvantages of the prior art. In particular, the present invention provides an innovative crane operation that reduces if not eliminates risks of major pendular load movements and the attendant hazards they present.

BRIEF SUMMARY OF THE INVENTION

According to an exemplary embodiment of the invention, a crane comprises a load lifting means, driving devices for moving the load lifting means through a traversing path defined by at least two target points, and a control device for controlling the driving devices to move the load lifting means along the traversing path, wherein the control device includes processing to determine the traversing path with a traversing path determining module utilizing point-to-point control with an overlooping function, and in an automatic mode, automatically move the load lifting means along the determined traversing path using an automatic traversing control module, and wherein the point-to-point control with the overlooping function is configured to operate such that when the load lifting means reaches an overlooping area of a target point, the load lifting means is directed to a next target point just before reaching the target point, wherein overlooping is begun when an axis of the load lifting means reaches a region defined by a sphere around the target point.

The various "modules" of the present invention can be included in a single control computer, or reside locally in one or more components of the crane.

In an asynchronous mode, the point-to-point control with the overlooping function is configured to operate asynchronously, wherein overlooping is begun when a last axis of the load lifting means reaches the region defined by the sphere around the target point; and In a synchronous mode, the point-to-point control with the overlooping function is configured to operate synchronously, wherein overlooping is begun when a leading axis of the load lifting means reaches the region defined by the sphere around the target point.

The traversing path can further be defined by a plurality of intermediate points between two target points, wherein through portions of the travel path that are defined by both target and intermediate points, the point-to-point control with the overlooping function is configured to operate such that when the load lifting means reaches an overlooping area of a point, the load lifting means is directed to a next point just before reaching the point, wherein overlooping is begun when an axis of the load lifting means reaches a region defined by a sphere around the point.

The load lifting means can be mounted on a hoisting cable, and wherein the driving devices several crane elements, one of the crane elements being the load lifting means.

The traversing path determining module can include a multipoint control module for determining the plurality of intermediate points.

The multipoint control module can be configured to fix the plurality of intermediate points equidistantly from each other.

The traversing path determining module can includes a path control module for determining a continuous, mathematically defined path between two target points.

The traversing path determining module can be connected to a teach-in device for assistance with determining the traversing path by manually approaching one or more target and intermediate points.

The traversing path determining module can be connected to a playback device for assistance with determining the traversing path and/or target and intermediate points of the traversing path by manually traversing the load lifting means along at least a portion of the traversing path.

The traversing path determining module can be connected to an external master computer that has access to a building data model, and provides target and intermediate points for the determination of the traversing path.

The traversing path determining module can be configured to consider working range limitations, and determine the traversing path around working range limitations.

The traversing path determining module can be connected to an external master computer that has access to a building data model including data concerning working range limitations and building contours of various construction phases, and provides target and intermediate target points for the determination of the traversing path, wherein the external master computer cyclically or continuously provides updated data concerning the working range limitations and/or concerning the building contours of the various construction phases, and wherein the traversing path determining module is configured to consider the updated data concerning the working range limitations and/or building contours when determining the traversing path.

The crane can further comprise a sway damping device configured to detect sway of the load lifting means as it is moved through the traversing path, wherein, in the automatic mode, the automatic traversing control module takes into account detected sway from the sway damping device and the control device controls the actuation of the driving devices to dampening the sway of the load lifting means as it moves along the traversing path.

The sway damping device can include a detection device for detecting the deflection of the hoisting cable, and/or the load lifting means with respect to a vertical axis through a suspension point of the hoisting cable, wherein the automatic traversing control module actuates one or more of the driving devices based on the detected deflection and/or a diagonal pull signal of the detection device.

The sway damping device can include a determination means for determining deformations and/or movements of structural components of the crane as a result of dynamic loads, and a control module configured to consider the determined deformations and/or movements of the structural components, as determined by the determination means, as a result of dynamic loads influencing the actuation of the one or more driving devices.

The structural components of the crane can comprise a tower and/or a boom, wherein the determination means is configured to determine deformations and/or loads of the tower and/or the boom as a result of dynamic loads.

The structural components of the crane can further comprise drive train parts, wherein the determination means is configured to determine deformations and/or movements of the drive train parts as a result of dynamic loads.

The determination means can include an estimating device for estimating the deformations and/or movements of the structural components as a result of dynamic loads based on digital data of a data model describing the crane structure.

The determination means can include a calculation unit for calculating structural deformations and resulting movements of structural components with reference to a stored calculation model, the stored calculation model based on control commands entered at a control stand.

The determination means can include a sensor system for detecting the deformations and/or dynamic parameters of the structural components.

The sensor system can include one or more of an inclination sensor for detecting tower inclinations, an acceleration sensor for detecting tower velocities, a rotational speed sensor for detecting a rotational speed of a boom, an acceleration sensor for detecting an acceleration of a boom, a pitching movement sensor for detecting pitching movements of a boom, a cable speed sensor for detecting cable speeds of the hoisting cable; or a cable acceleration sensor for detecting cable accelerations of the hoisting cable.

The sway damping device can include a filter and/or observer device for actuating variables of drive regulators, wherein the regulator actuating variables actuate the driving devices, wherein the filter and/or observer device is configured to receive, as a first set of input variables, the regulator actuating variables of the drive regulators; and at least one of, detected and/or estimated movements of crane elements, or deformations and/or movements of structural components wherein the at least one detected and/or estimated movements of crane elements, or deformations and/or movements of structural components, occur as a result of dynamic loads, wherein the filter and/or observer device is configured to influence the regulator actuating variables based on dynamically induced movements of the crane elements, and wherein the regulator actuating variables are obtained for particular actuating variables and/or deformations of structural components.

The filter and/or observer device can be configured as a Kalman filter.

As discussed above, the control device can be configured in an autopilot mode that is able to automatically traverse the load lifting means of the crane between at least two target points. In the automatic mode, the control device traverses the load hook or the load lifting means between the target points without manual actuation by an operator.

The traversing path determining module determines the desired traversing path between the at least two target points, and an automatic traversing control module handles automatically traversing the load lifting means along the determined traversing path.

With the traversing path determining module it is possible to interpolate between two target points and/or to make a calculation of intermediate positions that help define in more detail the traversing path between two target points. The traversing control module then actuates the drive regulators or driving devices in line with the interpolated or calculated intermediate positions in order to approach the intermediate positions and target points with the load lifting means or to automatically follow the determined traversing path.

The automatic mode of the control device seeks to avoid, if not eliminate, the potential of premature fatigue of the crane operator. It can handle monotonous work such as constantly moving to and fro between two fixed target points, freeing the operator from such monotonous tasks.

The automatic determination of the traversing path between the target points, and the actuation of the driving devices in dependence on the traversing path, also avoids the undesired pendular movements of the lifted load due to clumsy manual actuation of the control elements, or an operator's poor selection/determination of a traversing path.

There are various ways to determine the traversing path between the target points. For example, the traversing path determining module can include a PTP or point-to-point control module that is configured to exactly approach two target points, wherein the course of the path between the points is not yet firmly defined, however.

A PTP control module can include an overlooping function where the traversing path is determined such that for a time-optimized traversal, a defined target point is not approached exactly, but on reaching an overlooping area around a point, a turn is made to the next point.

The overlooping function of the PTP control module can be configured to operate asynchronously, so the overlooping is started when a last drive axis, or driving device to be actuated, reaches the overlooping area around a point (for example, a sphere around the point). Alternatively, the overlooping function can be configured to operate synchronously, so that overlooping is started as soon as a leading axis of movement, or drive axis, reaches the sphere around the programmed point.

In another exemplary embodiment, the traversing path determining module can include a multipoint control module that determines a plurality of intermediate points in between two target points to be approached. The intermediate points can form a dense sequence of temporally equidistant points. Approaching a dense sequence of temporally equidistant intermediate points requires approximately the same period of time. This leads to a generally harmonic actuation of the driving devices, wherein a harmonic traversal of the crane elements can be achieved.

In another exemplary embodiment, the determination of the traversing path can be made with a path control module that calculates a continuous, mathematically defined path of movement between target points. The path control module can comprise an interpolator that corresponds to a specified path function or subfunction (for example, in the form of a straight line, a circle or a polynomial) that determines intermediate values based upon the calculated three-dimensional curve. The path control module then provides the path function to the driving devices or their drive regulator. The interpolator can perform a linear interpolation and/or a circular interpolation and/or a spline interpolation and/or special interpolations (for example, Bezier or spiral interpolations). The interpolation can be executed with or without overlooping.

The various modules, programming and/or determinations, calculations and the like can run/handled online or offline.

During online programming, determination of the desired traversing path can be performed by a teach-in device where a desired target and intermediate points of the desired traversing path are approached by manual actuation of the control elements of the control device, and/or by actuation of a hand-held programming device where the teach-in device stores the target and intermediate points.

An experienced crane operator using the control console can manually operate the crane and/or the load hook along a desired traversing path. Coordinates or intermediate points reached in this manner can be stored in the control device. If not manually, in the automatic mode, the control device of the crane can autonomously approach stored target and intermediate points.

The traversing path determining module also can include a playback device for determining the desired traversing path by manually traversing the load hook along the desired traversing path. While manually guiding the load hook along the desired traversing path, coordinates or intermediate points are recorded so that the control device of the crane can repeat the corresponding movements via the stored information.

Alternatively, or in addition, further measures can be taken for the online programming of the desired traversing path, for example an online programming of specified program blocks or for a sensor-based programming operation.

In an offline determination of the desired traversing path, the traversing path determining module can be connected to an external master computer that has access to a building data model. Target points and/or intermediate points of the traversing path can be derived from the digital data of the building data model. The traversing path determining module can then determine the traversing path, for example by PTP control, multipoint control or path control, using the target points and/or intermediate points provided from the building data model. But in this scenario, the programming need not be online as the master computer has the files needed to perform the tasks.

In building information modeling (BIM), digital information on a building to be constructed/erected/worked by the crane is stored and retrievable by the present invention. In respect to the present crane control, a BIM can contain three-dimensional plannings of all sections of relevant structures, time schedules and cost schedules. Building data and/or BIM generally are computer-readable files or file conglomerates, or processing computer program blocks for processing data, in which information and characteristics are contained that describe the building to be erected or to be worked on and its relevant properties in the form of digital data. Three-dimensional building data can also be CAD data.

The target points can be determined from the building data. Crane lifts can be modeled by a crane lift determining module. The crane lift determining module can identify target points for a crane lift and their attendant coordinates, for example, a first point being a delivery station of a concrete mixer and a second point being an emptying area of the concrete bucket for a concreting task. In addition, building data that reflects geometry of a constructed building in various construction phases can be considered when determining the traversing path in order to avoid collisions with already constructed/existing contours of the growing building.

When the target points and collision-avoiding intermediate points have been identified for the traversing path, they can be provided to the traversing path determining module, which then determines the traversing path with reference to these target and intermediate points.

Determination of the traversing path can also include a set of intermediate points that take into account working range limitations of the crane. For example, working ranges of two or more cranes in proximity to one another should be considered to avoid potential collisions with one another. Working range limitations and/or data defining working range limitations can be obtained online, offline and/or provided from the building data model.

If not automated, manual input of working range limitations can be provided directly on the crane, which then can be considered when the desired traversing path is determined. Advantageously, working range limitations can be taken into account dynamically when corresponding digital data for the working range limitations is provided from the building data model or BIM, since near real-time construction progresses and resulting changes in various construction phases are dynamically changing.

The automatic traversing control module can be configured to automatically determine traversing speeds and/or accelerations, and generate corresponding actuation signals for driving devices that might be different than the traversing speeds or accelerations that have been specified in the teach-in process or in the playback programming. The traversing control module can automatically determine the traversing speeds and/or accelerations of the drives to minimize swaying events that might not be evident from the teach-in process or in the playback programming. Environmental conditions change from time-to-time, and one set of speeds/accelerations under sunny skies with no winds might be different from another set of speeds/accelerations in cold, damp and windy conditions even when the same points are being approached. Or depending on point spacing and traversing path trajectories, high traversing speeds can be achieved, while a gentle and non-swaying approach of target points can also be achieved.

The traversing control module can be connected to a sway damping device and/or consider specifications of a sway damping device. Such anti-sway devices for cranes are known in principle in various configurations, for example, by actuation of the slewing gear, luffing and trolley drives in dependence on particular sensor signals, such as inclination and/or gyroscope signals. For example, DE 20 2008 018 260 U1 and DE 10 2009 032 270 A1 disclose anti-sway systems on cranes, the subject-matter of same herein expressly made and incorporated, i.e., with regard to a configuration of a sway damping device.

The traversing control module for sway damping of the present invention can consider the deflection angle or the diagonal pull of the load hook of the crane with respect to a vertical axis that goes through the trolley or the suspension point of the hoisting cable. A corresponding detection device for detecting the deflection of the load lifting means with respect to the vertical axis can be configured to operate optically, and include an imaging sensor system, for example a camera, that looks substantially vertically downwards from the suspension point of the hoisting cable.

An image evaluation device can identify the crane hook in an image provided by the imaging sensor system, and can determine its eccentricity or its displacement out of the image center. This would provide a measure for the deflection of the crane hook with respect to the vertical axis, and thus characterize load sway.

The traversing control module can consider the deflection of the load hook determined in this way, and actuate the driving devices and/or determine their accelerations and speeds so the deflections of the load hook with respect to the vertical axis are minimized or do not exceed a certain measure (fall within an acceptance tolerance).

The position sensor system can be configured to detect the load relative to a fixed world coordinate system. The traversing control device can be configured to position the load relative to a fixed world coordinate system.

The present invention can further include a control device that positions the load relative to the fixed world coordinate system or the crane foundation, and thus is not directly dependent on the crane structure oscillations and the crane position. Using this kind of control device beneficially decouples load position from crane oscillations, so in effect the load is not directly guided relative to the crane, but relative to the fixed world coordinate system or the crane foundation.

Structural oscillations of the crane in total, or structural parts of the crane, can be taken into account by the control device, and those oscillations damped by the driving behavior. This, in turn, is relatively gentle on the steel construction, minimizing stresses.

Depending on load position detection, the present invention can provide diagonal pull regulation that limits if not eliminates static deformation caused by the suspended load. To minimize/eliminate oscillation dynamics, the present sway damping device can be configured to correct the slewing gear and the trolley traveling gear so the cable always is as close to perpendicular to the load as possible, even if the crane inclines forward due to the increasing load moment.

For example, when lifting a load from the ground, a pitching movement of the crane results from its deformation under the load. If taken into account, the trolley traveling gear can be traced by considering the detected load position or the trolly can be positioned by an anticipatory assessment of the pitching deformation. Thus, with any crane deformation the hoisting cable can be positioned perpendicularly above the load. The largest static deformation occurs at the point at which the load leaves the ground. After that, diagonal pull regulation no longer is necessary. The slewing gear correspondingly can also be traced by taking account of the detected load position and/or be positioned by an anticipatory assessment of transverse deformations where with the resulting crane deformation, the hoisting cable is positioned perpendicularly above the load.

Diagonal pull regulation can be activated by the operator, who thereby can use the crane as a manipulator. The operator then can reposition the load simply via pushing and/or pulling. Diagonal pull regulation attempts to follow the deflection that is caused by the operator.

In sway-damping measures of the present invention, the traversing control module not only can consider actual pendular movement of the cable, but also the dynamics of the steel construction of the crane and its drive trains. In this determination, the crane no longer is assumed to be an immovable rigid body that directly and identically, i.e. on a 1:1 basis, converts the drive movements of the driving devices into movements of the suspension point of the hoisting cable. Instead, the sway damping device considers the crane as a soft structure which in its steel components (such as the tower lattice and drive trains) exhibits elasticities and resiliencies in the case of accelerations. The sway damping device takes into account these dynamics when exerting a sway-damping influence on the actuation of the driving devices.

The sway damping device can comprise determination means for determining dynamic deformations and movements of structural components under dynamic loads. The control module of the sway damping device, which influences the actuation of the driving device in a sway-damping way, is configured to consider the determined dynamic deformations of the structural components of the crane when influencing the actuation of the driving devices.

Thus, the sway damping device advantageously does not regard the crane or machine structure as a rigid, infinitely stiff structure, but considers a multitude of elastically deformable and/or resilient and/or relatively soft sub-structure that, in addition to the axes of the positioning movement of the machine (for example, the boom luffing axis or the tower axis of rotation), permits movements and/or changes in position due to deformations of the structural components.

The mobility of the machine structure as a result of structural deformations under load or dynamic loads is an important consideration. This is especially true in the case of elongate, relatively slender structures, and deliberately static and dynamic marginal conditions. To be able to better tackle the causes of swaying, the sway damping system takes account of such deformations and movements of the machine structure under dynamic loads.

In this way, the present invention provides several beneficial improvements over conventional system. First, the oscillation dynamic of the structural components is reduced by the regulating behavior of the control device. Oscillations are actively damped by the driving behavior. More preferably, oscillations do not result from the regulating behavior of the present invention. Second, steel construction is subject to less stress. Impact loads are reduced due to the regulating behavior. Third, the influence of the driving behavior is definable. Due to the knowledge of the structural dynamics and the regulating method, pitching oscillations can be reduced and damped. As a result, the load behaves more calmly, and sways up and down in the rest position are minimized if not eliminated.

The elastic deformations and movements of the structural components and drive trains can be determined in various ways. In a development of the present invention, the determination means can comprise an estimating device that assesses the deformations and movements of the machine structure under dynamic loads. These can be obtained in dependence on control commands entered at the control stand and/or in dependence on particular actuating actions of the driving devices and/or in dependence on particular speed and/or acceleration profiles of the driving devices, by taking account of circumstances characterizing the crane structure.

The present estimating device can access a data model in which structural variables of the crane such as tower height, boom length, rigidities, area moments of inertia and the like are stored and/or linked with each other in order to then assess with reference to a concrete load situation, i.e., weight of the load lifted on the load hook and current outreach, what dynamic effects, i.e., deformations, are obtained in the steel construction and in the drive trains for a particular actuation of a driving device.

The sway damping device can use this information from the estimating device and then intervene in the actuation of the driving devices. The sway damping device can then influence the actuating variables of the drive regulators of the driving devices in order to avoid or reduce the pendular movements of the load hook and the hoisting cable.

The determination device for determining structural deformations can include a calculation unit that calculates these structural deformations and resulting movements of structural parts of the crane with reference to a stored calculation model in dependence on control commands entered at the control stand.

A model similar to a finite element model, or a finite element model itself, can then be constructed, but under either scenario the model is simplified as compared to a conventional finite element model. The model can be determined empirically by detecting structural deformations under certain control commands and/or load conditions on the real crane or the real machine. The calculation model can operate using tables in which particular deformations are associated with particular control commands, wherein intermediate values of the control commands can be converted into corresponding deformations by means of an interpolation device.

The sway damping device can also comprise a sensor system where elastic deformations and movements of various structural components under dynamic loads are detected. The sensor system can comprise deformation sensors such as strain gauges on the steel construction of the crane, for example, on the lattice trusses of the tower and/or of the boom. Alternatively, or in addition, acceleration and/or speed sensors can be provided in order to detect particular movements of structural components. These movements can include pitching movements of the boom tip and/or rotatory dynamic effects on the boom.

The sensor system can further comprise inclination sensors and/or gyroscopes. These sensors can be provided for example on the tower, for example, on its upper portion on which the boom is mounted, in order to detect dynamics of the tower. Jerky lifting movements can lead to pitching movements of the boom, which are accompanied by bending movements of the tower. This cascade of post-oscillation of the tower in turn can lead to pitching oscillations of the boom, which are accompanied by corresponding load hook movements.

Alternatively, or in addition, movement and/or acceleration sensors can also be associated with the drive trains in order to detect dynamics of the drive trains. For example, rotary encoders can be associated with deflection pulleys of the trolley for the hoisting cable and/or with deflection pulleys for a bracing cable of a luffing boom in order to be able to detect the actual cable speed.

Advantageously, suitable movement and/or speed and/or acceleration sensors also are associated with the driving devices in order to detect the drive movements of the driving devices, and then relate them to assessed and/or detected/actual deformations of structural components of the crane, for example, the steel construction elements and drive trains.

Alternatively, or in addition to a sway damping device with a traversing control module, sway damping measures can also be considered when planning or determining the desired traversing path. For example, the traversing path determining module can round off bends of the traversing path or generously dimension curve radii and/or avoid serpentine lines.

BRIEF DESCRIPTION OF THE DRAWINGS

The invention will subsequently be explained in detail with reference to preferred exemplary embodiments and associated drawings. In the drawings.

DETAILED DESCRIPTION OF THE INVENTION

Figure 1:
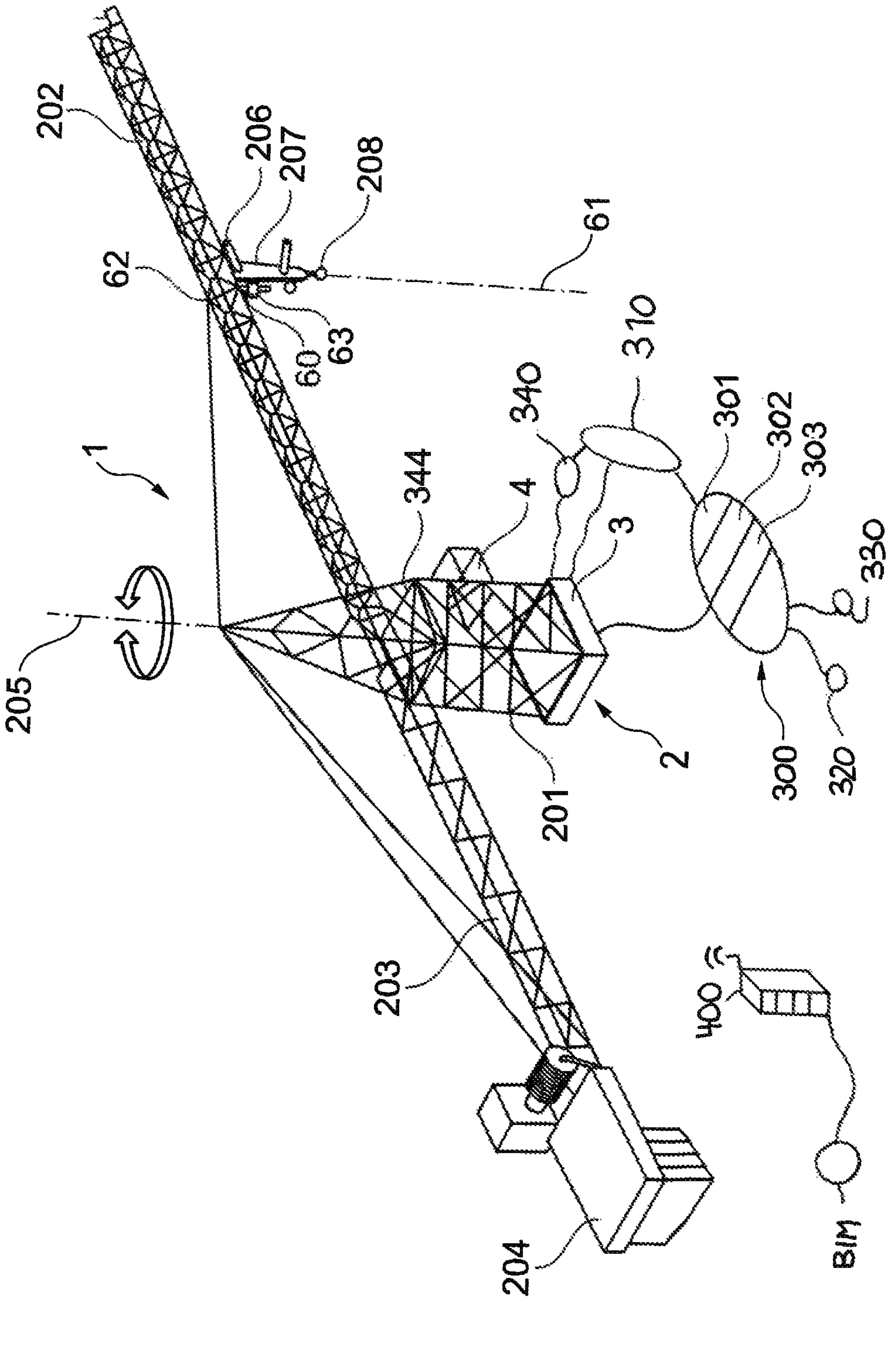
FIG. 1: shows a schematic representation of a tower crane whose load hook is to be traversed between two target points in the form of a concrete delivery station and a concreting field.

As shown in FIG. 1, the crane can be configured as a tower crane. The tower crane shown in FIG. 1 for example can include a tower 201 that carries a boom 202 that is balanced by a counter-boom 203 on which a counter weight 204 is provided. The boom 202 together with the counter-boom 203 can be rotated by a slewing gear about an upright axis of rotation 205, which can be coaxial to the tower axis. On the boom 202 a trolley 206 can be traversed by a trolley drive, wherein a hoisting cable 207 to which a load hook 208 is attached runs off from the trolley 206.

As is likewise shown in FIG. 1, the crane 2 can include an electronic control device 3 which for example can comprise a control computer arranged on the crane itself. The control device 3 can actuate various actuators, hydraulic circuits, electric motors, driving devices and other work units on the respective construction machine. In the illustrated crane, this can be a hoisting gear, a slewing gear, a trolley drive, a boom luffing drive, and the like.

The electronic control device 3 can communicate with a terminal 4 that can be arranged on the control stand or in the operator cabin and for example can have the form of a tablet with touchscreen and/or a joystick so that on the one hand various information can be indicated by the control computer 3 on the terminal 4 and vice versa control commands can be entered into the control device 3 via the terminal 4.

Figure 6:
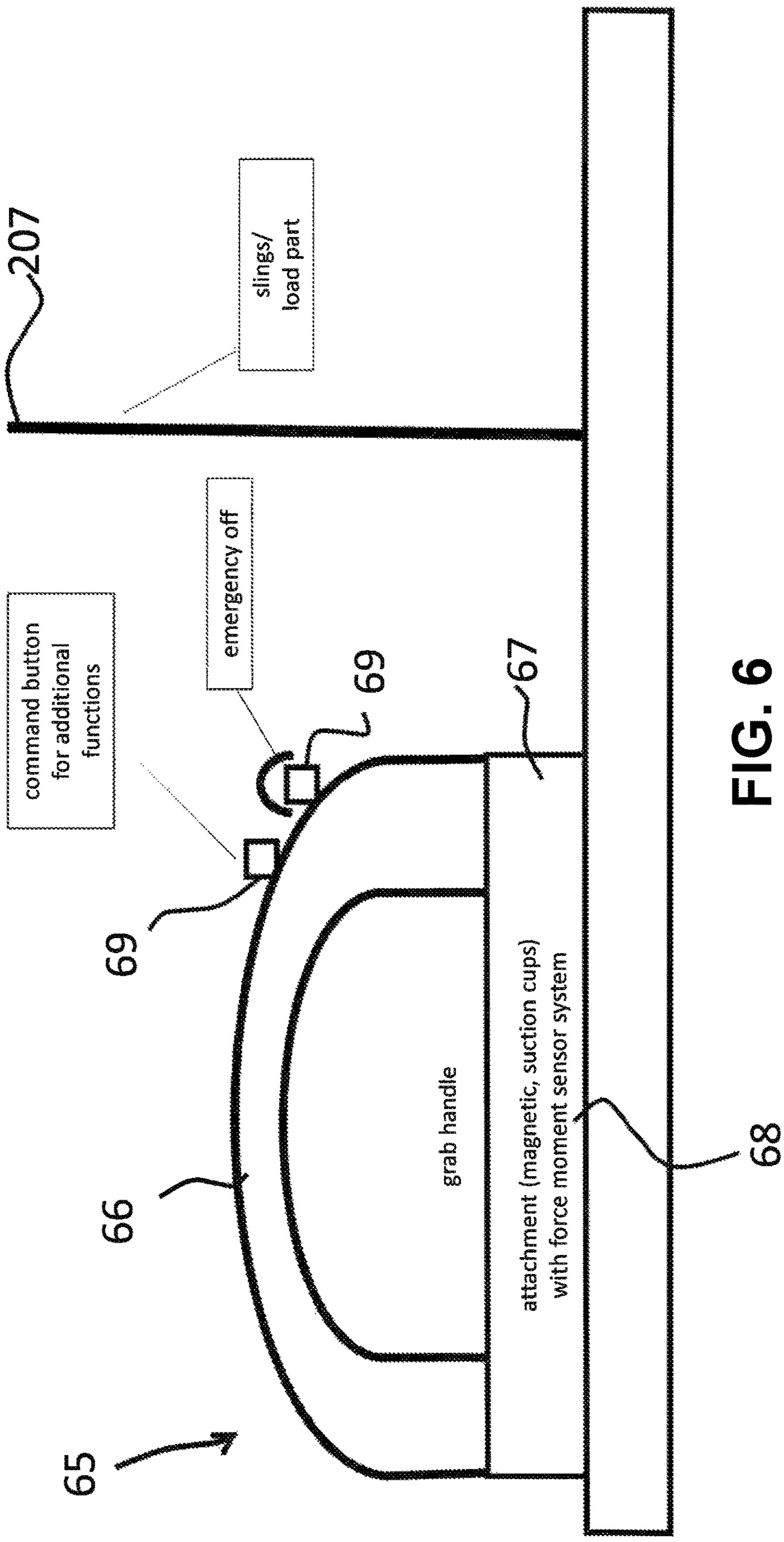
FIG. 6: shows a schematic representation of a control module that can be docked to the load hook or a component attached thereto in order to be able to finely adjust the load hook at a target point or to manually traverse the same along a desired path for a play-back or teach-in programming operation.

The control device 3 of the crane 1 can be configured to also actuate the driving devices of the hoisting gear, the trolley and the slewing gear when the load hook 208 and/or a component lifted thereon, such as a concrete bucket, is manually manipulated by a machine operator by means of a hand control module 65 with a handle 66, as this is shown in FIG. 6, i.e. is pushed or pulled in one direction and/or rotated or this is attempted to provide for a manual fine directing of the load hook and hence concrete bucket position for example during concreting work.

For this purpose, the crane 1 can include a detection device 60 that detects a diagonal pull of the hoisting cable 207 and/or deflections of the load hook 208 with respect to a vertical axis 61 that goes through the suspension point of the load hook 208, i.e. the trolley 206.

The determination means 62 of the detection device 60 provided for this purpose can operate optically, for example, in order to determine the deflection. A camera 63 or another imaging sensor system can be mounted on the trolley 206, which looks vertically downwards from the trolley 206 so that with non-deflected load hook 208 its image display lies in the center of the image provided by the camera 63. When the load hook 208 however is deflected with respect to the vertical axis 61, for example by manually pushing or pulling the load hook 208 or the concrete bucket, the image display of the load hook 208 moves out of the center of the camera image, which can be determined by an image evaluation device 64.

In dependence on the detected deflection with respect to the vertical axis 61, by taking account of the direction and magnitude of the deflection, the control device 3 can actuate the slewing gear drive and the trolley drive in order to again bring the trolley 206 more or less exactly over the load hook 208, i.e. the control device 3 actuates the driving devices of the crane 1 such that the diagonal pull or the detected deflection is compensated as far as possible. In this way, an intuitive easy directing and fine adjustment of the position of the load hook and a load lifted thereon can be achieved.

Alternatively, or in addition, the detection device 60 also can comprise the control module 65, which is of the mobile type and can be configured to be docked to the load hook 208 and/or a load lifted thereon. As shown in FIG. 6, a hand control module 65 can comprise a grab handle 66, which by means of suitable holding means 67 preferably can be releasably attached to the load lifting means 208 and/or a component articulated thereto, such as the concrete bucket. The holding means 67 for example can comprise magnetic holders, suction cups, detent holders, bayonet lock holders or the like.

Forces and/or torques and/or movements exerted on the grab handle 66 can be detected by the present invention. The grab handle 66 can comprise force and/or torque sensors 68. The sensor system associated with the grab handle 66 is advantageously configured such that the forces and/or torques and/or movements can be detected in terms of their direction of action and/or magnitude, cf. FIG. 6.

With reference to the manipulation forces and/or torques and/or movements exerted on the grab handle 66, which are detected by the detection device 60, the control device 3 can actuate the driving devices of the crane 1 such that the detected manual manipulations are converted into motoric crane positioning movements. Manual directing of the concrete bucket or load lifting means 208 can provide fine tuning to the approach of target positions.

To be able to carry out automated crane lifts, for example to be able to automatically move to and fro between the concrete delivery station and the concreting area, the control device 3 comprises a traversing path determining module 300 for determining a desired traversing path between at least two target points and an automatic traversing control module 310 for automatically traversing the load lifting means along the determined traversing path by correspondingly actuating the driving device of the crane 200.

To provide for various operating modes, the traversing path determining module 300 can have various working modes and include corresponding modules, for example a PTP or point-to-point control module 301, a multipoint control module 302 and a path control module 303, cf. FIG. 1.

Figure 2:
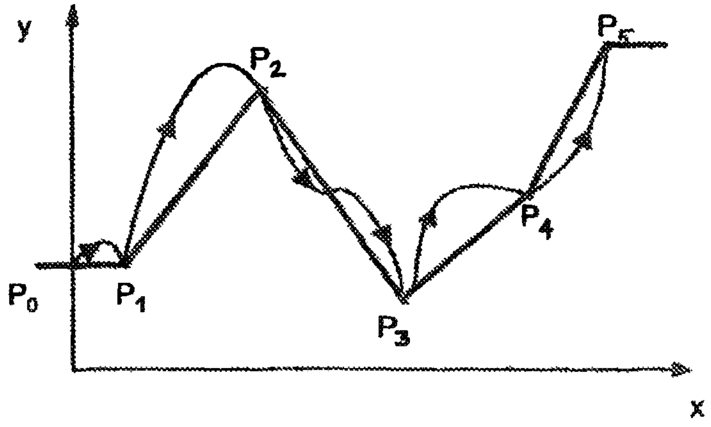
FIG. 2: shows a schematic diagram to illustrate the mode of operation of a PTP control module that determines the traversing path in the sense of a point-to-point control.

The PTP control module 301 can include an overlooping function. The PTP control with the overlooping function is configured to operate such that when the load lifting means reaches an overlooping area of a target point, the load lifting means is directed to a next target point just before reaching the target point, wherein overlooping is begun when an axis of the load lifting means reaches a region defined by a sphere around the target point, cf. FIG. 2.

In a development of the invention, the overlooping function of the PTP control module 301 can be configured to operate asynchronously, so that overlooping is started when the last drive axis or driving device to be actuated reaches the sphere around the point. Alternatively, the overlooping function also can be configured or controlled synchronously, so that overlooping is started as soon as the leading axis of movement or drive axis penetrates into the sphere around the programmed point.

Figure 3:
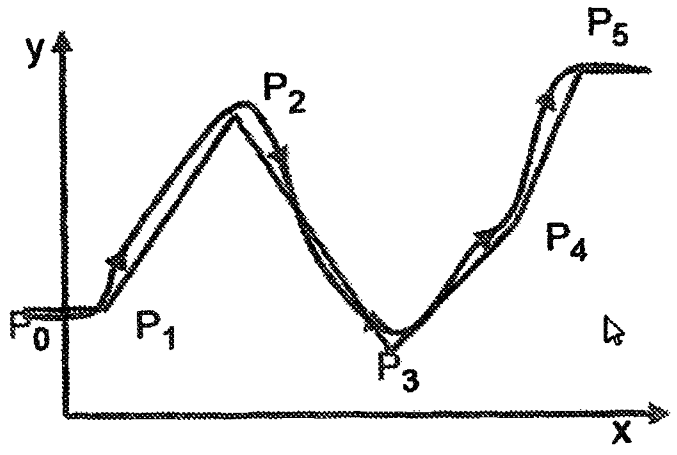
FIG. 3: shows a schematic diagram to illustrate the mode of operation of a multipoint control module that determines the traversing path in the sense of a multipoint control.
Figure 4:
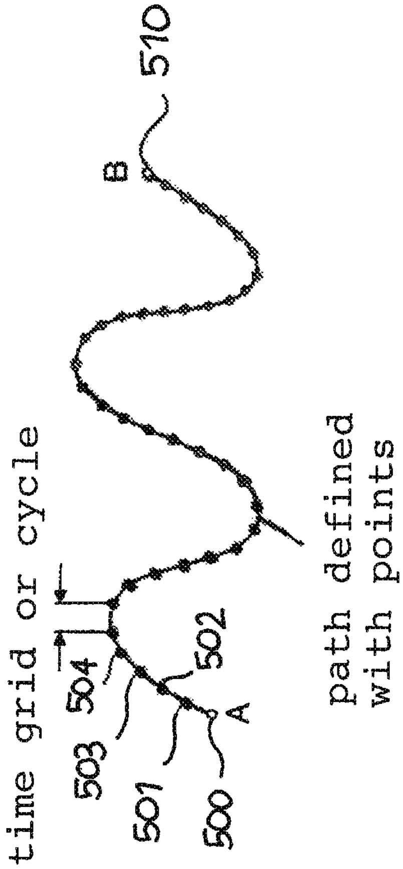
FIG. 4: shows the traversing path generated by a multipoint control, which is defined by a dense sequence of temporally equidistant points.

The traversing path determining module 300 can also include a multipoint control module 302, cf. FIG. 3, which between two target points 500, 510 to be approached determines a plurality of intermediate points 501, 502, 503, 504 such that the intermediate points 501, 502, 503, 504 form a dense sequence of temporally equidistant points, cf. FIG. 4. Approaching such temporally equidistant intermediate points 501, 502, 503, 504, which are arranged in a dense sequence, requires approximately the same period of time so that a generally harmonic actuation of the driving devices and hence a harmonic traversal of the crane elements can be achieved.

Figure 5A:
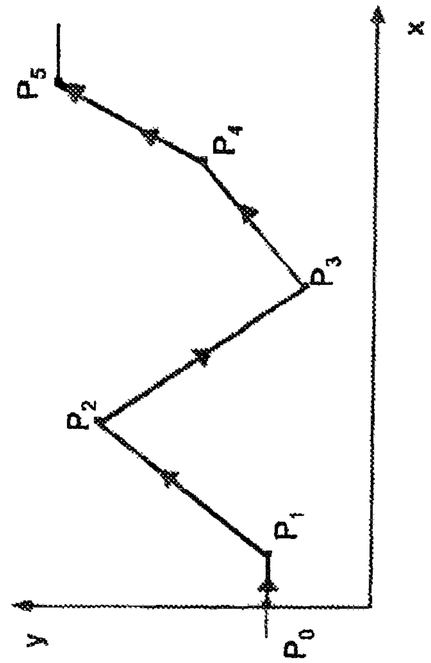
FIG. 5: shows two schematic diagrams to illustrate the mode of operation of a path control module that determines the traversing path as a continuous, mathematically calculated path of movement, wherein the subdiagram (a) shows a path control without over-looping and the subdiagram (b) shows a path control with over-looping.
Figure 5B:
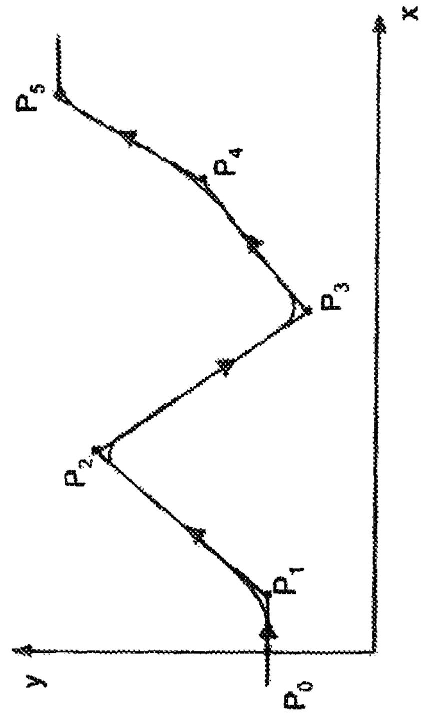

The determination of the traversing path can be made with a path control module 303 that calculates a continuous, mathematically defined path of movement between target points, cf. FIG. 5. The path control module can comprise an interpolator that corresponds to a specified path function or subfunction (for example, in the form of a straight line, a circle or a polynomial) that determines intermediate values based upon the calculated three-dimensional curve. The path control module then provides the path function to the driving devices or their drive regulator. The interpolator can perform a linear interpolation and/or a circular interpolation and/or a spline interpolation and/or special interpolations (for example, Bezier or spiral interpolations). The interpolation can be executed with or without overlooping. FIG. 5*a* shows a path without overlooping, FIG. 5*b* a path with overlooping.

The programming or determination of the path routing or of the traversing path can be affected online or offline.

During online programming, determination of the desired traversing path can be performed by a teach-in device 320 where a desired target and intermediate points of the desired traversing path are approached by manual actuation of the control elements of the control device, and/or by actuation of a hand-held programming device where the teach-in device 320 stores the target and intermediate points.

An experienced crane operator using the control console can manually operate the crane 2 and/or the load hook 208 along a desired traversing path. Coordinates or intermediate points reached in this manner can be stored in the control device 3. If not manually, in the automatic mode, the control device 3 of the crane 2 can autonomously approach stored target and intermediate points.

Alternatively, or in addition to a teach-in device 320, the traversing path determining module 300 also can include a playback device 330 for determining the desired traversing path by manually traversing the load hook along the desired traversing path. While manually guiding the load hook 208 along the desired traversing path, which can be affected for example by means of the hand control module 65, cf. FIG. 6, coordinates or intermediate points are recorded so that the control device 3 of the crane 2 can exactly repeat the corresponding movements.

The automatic traversing control module 310 advantageously can consider specifications of a sway damping device 340, wherein the sway damping device 340 advantageously can utilize the signals of the aforementioned detection device 60 which detects the deflection of the load hook 208 with respect to the vertical axis 61.

As is furthermore shown in FIG. 1, the control device 3 can be connected to an external, separate master computer 400 that can have access to a building data model in the sense of a BIM model and can provide digital data from this building data model to the control device 3. In the way explained above, these digital data from the building data model can be used to provide target and intermediate points for the determination of the desired traversing path, which can dynamically consider building data in various phases and working range limitations.

The control device 3 of the crane 1 can be configured to also actuate the driving devices of the hoisting gear, the trolley and the slewing gear when the sway damping device 340 detects characteristics that evidence sway.

For this purpose, the crane 1 can use the detection device 60 which detects a diagonal pull of the hoisting cable 207 and/or deflections of the load hook 208 with respect to the vertical axis 61 that goes through the suspension point of the load hook 208, i.e. the trolley 206. The cable pull angle φ against the line of action of gravity, i.e. the vertical axis 61, can be detected, cf. FIG. 1.

In dependence on the detected deflection with respect to the vertical axis 61, by taking account of the direction and magnitude of the deflection, the control device 3 can actuate the slewing gear drive and the trolley drive by means of the sway damping device 340 in order to again bring the trolley 206 at least approximately directly over the load hook 208 and to compensate or reduce pendular movements or not even have them occur at all.

For this purpose, the sway damping device 340 also can comprise determination means 342 for determining dynamic deformations of structural components, wherein the control module 341 of the sway damping device 340, which influences the actuation of the driving device in a sway-damping way, is configured to consider the determined dynamic deformations of the structural components of the crane when influencing the actuation of the driving devices.

The determination means 342 can include an estimating device 343 for estimating the deformations and/or movements of the structural components as a result of dynamic loads based on digital data of a data model describing the crane structure.

The determination means 342 can include a calculation unit 348 for calculating structural deformations and resulting movements of structural components with reference to a stored calculation model, the stored calculation model based on control commands entered at a control stand.

Alternatively, or in addition, the sway damping device 340 also can comprise a suitable sensor system 344 by means of which such elastic deformations and movements of structural components under dynamic loads are detected. A sensor system 344 can comprise deformation sensors such as strain gauges on the steel construction of the crane, for example on the lattice trusses of the tower 201 or of the boom 202. Alternatively, or in addition, acceleration and/or speed sensors can be provided in order to detect particular movements of structural components such as pitching movements of the boom tip or rotatory dynamic effects on the boom 202. Alternatively, or in addition, inclination sensors or gyroscopes can also be provided for example on the tower 201 on its upper portion on which the boom is mounted, in order to detect the dynamics of the tower 201. Alternatively, or in addition, movement and/or acceleration sensors can also be associated with the drive trains in order to be able to detect the dynamics of the drive trains. For example, rotary encoders can be associated with the deflection pulleys of the trolley 206 for the hoisting cable and/or with deflection pulleys for a bracing cable of a luffing boom in order to be able to detect the actual cable speed at the relevant point.

The sway damping device 340 can comprise a filter device or an observer 345 which observes the crane reactions that are obtained with particular actuating variables of the drive regulators 347 and by taking account of predetermined regularities of a dynamic model of the crane, which can be designed differently in principle and can be obtained by analysis and simulation of the steel construction, influences the actuating variables of the regulator with reference to the observed crane reactions.

A filter or observer device 345 can be configured in the form of a so-called Kalman filter 346, to which as an input variable the actuating variables of the drive regulators 347 of the crane and the crane movements, the cable pull angle φ with respect to the vertical axis 62 and/or its temporal change or the angular velocity of the diagonal pull is supplied, and which correspondingly influences the actuating variables of the drive controllers 347 on the basis of these input variables with reference to Kalman equations, which model the dynamic system of the crane structure, for example its steel components and drive trains.

Figure 7A:
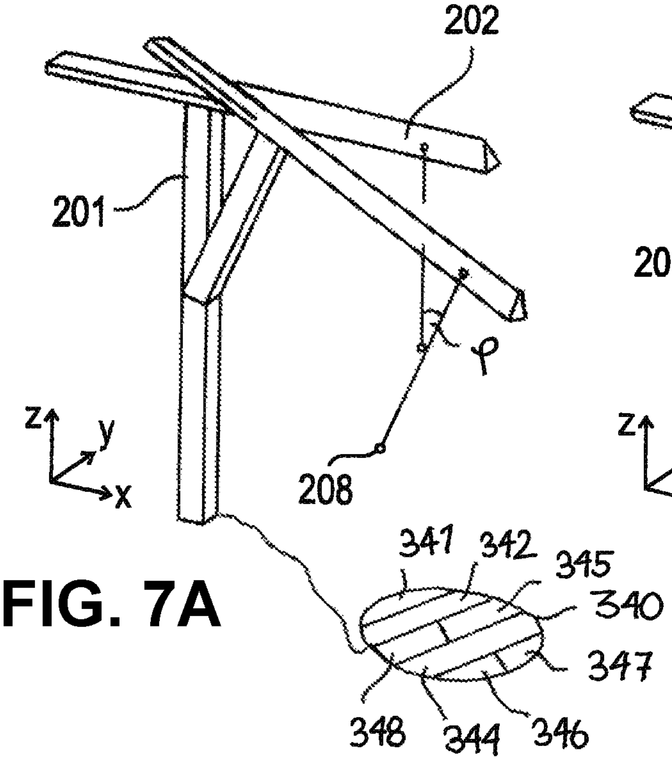
FIG. 7: shows a schematic representation of deformations and forms of oscillation of a tower crane under load and the damping or avoidance thereof by a diagonal pull regulation, wherein the partial view a.) shows a pitching deformation of the tower crane under load and a related diagonal pull of the hoisting cable, the partial views b.) and c.) show a transverse deformation of the tower crane in a perspective representation and a top view from above, and the partial views d.) and e.) show a diagonal pull of the hoisting cable associated with such transverse deformations.

By means of diagonal pull regulation, deformations and forms of oscillation of the tower crane under load can be damped or avoided, as shown in FIG. 7 by way of example, wherein FIG. 7*a* initially schematically shows a pitching deformation of the tower crane under load as a result of a deflection of the tower 201 with the resulting lowering of the boom 202 and a related diagonal pull of the hoisting cable.

Figure 7B:
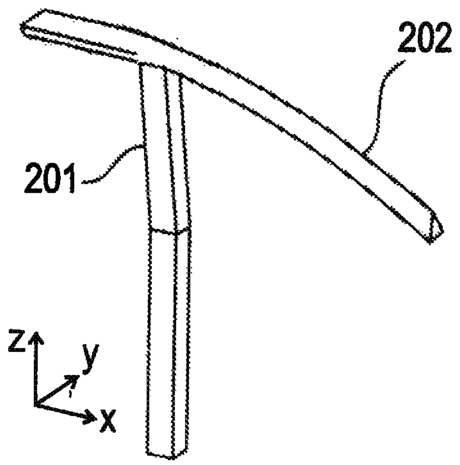
Figure 7C:
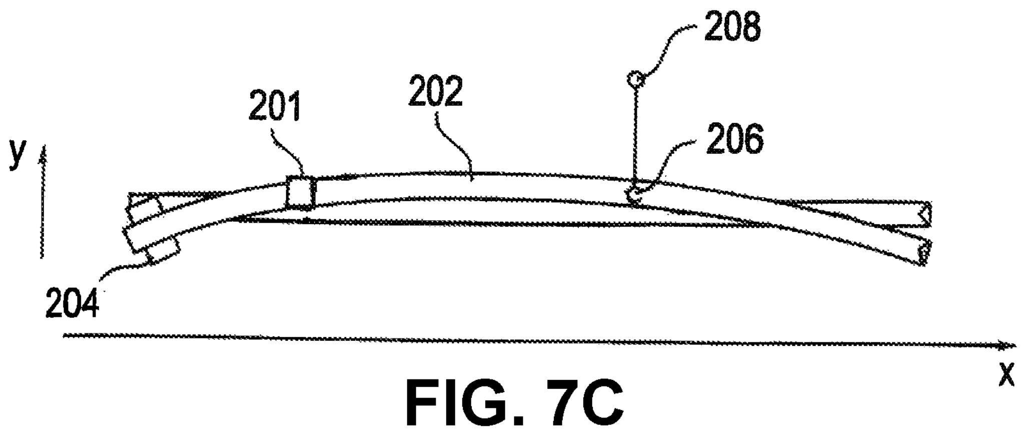

Furthermore, the partial views FIGS. 7*b* and 7*c* schematically show a transverse deformation of the tower crane in a perspective representation and in a top view from above with the occurring deformations of the tower 201 and the boom 202.

Figure 7D:
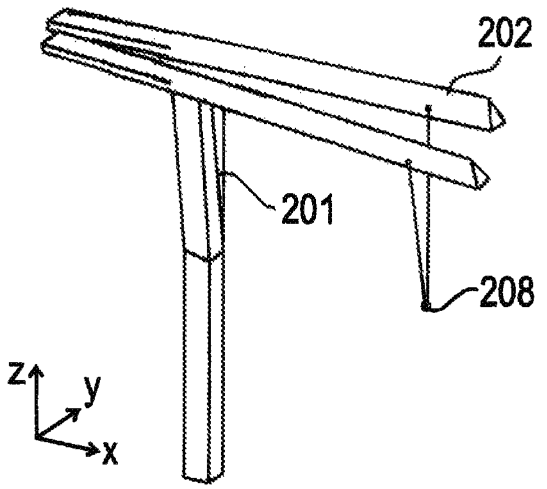
Figure 7E:
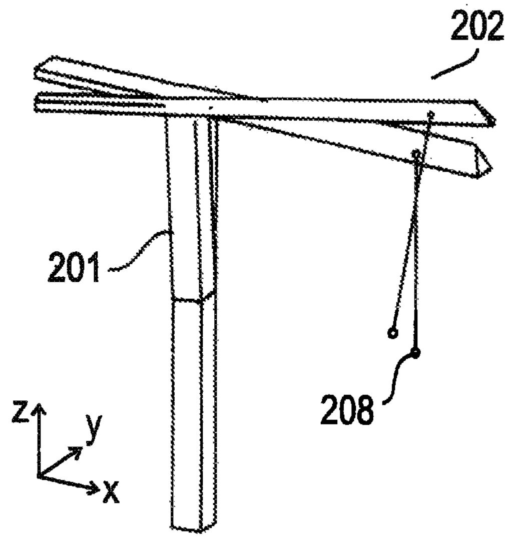

Finally, FIGS. 7*d* and 7*e* show a diagonal pull of the hoisting cable connected with such transverse deformations.

To counteract the corresponding oscillation dynamics, the sway damping device 340 can comprise a diagonal pull regulation. The position of the load hook 208 and its diagonal pull with respect to the vertical axis, i.e. the deflection of the hoisting cable 207 with respect to the vertical axis, is detected by means of the determination means 62 and supplied to the Kalman filter 346.

Advantageously, the position sensor system can be configured to detect the load or the load hook 308 relative to a fixed world coordinate system and/or the sway damping device 340 can be configured to position the load relative to a fixed world coordinate system.

Due to the load position detection a diagonal pull regulation can be realized, which eliminates or at least reduces a static deformation by the suspended load. To reduce an oscillation dynamic or to not have it occur at all, the sway damping device 340 can be configured to correct the slewing gear and the trolley traveling gear such that the cable always is perpendicular to the load as far as possible, even if the crane more and more inclines forward due to the increasing load moment.

For example, when lifting a load from the ground, the pitching movement of the crane as a result of its deformation under the load can be taken into account and the trolley traveling gear can be traced by taking account of the detected load position or be positioned by an anticipatory assessment of the pitching deformation such that with the resulting crane deformation the hoisting cable is positioned perpendicularly above the load. The largest static deformation occurs at the point at which the load leaves the ground. Then, a diagonal pull regulation no longer is necessary. Alternatively or in addition, the slewing gear correspondingly can also be traced by taking account of the detected load position and/or be positioned by an anticipatory assessment of a transverse deformation such that with the resulting crane deformation the hoisting cable is positioned perpendicularly above the load.

Diagonal pull regulation can be activated by the operator, who thereby can use the crane as a manipulator. The operator then can reposition the load simply via pushing and/or pulling. Diagonal pull regulation attempts to follow the deflection that is caused by the operator.

The invention claimed is:

1. A crane comprising:

a load lifting means;

driving devices for moving the load lifting means through a traversing path defined by at least two target points; and a control device for controlling the driving devices to move the load lifting means along the traversing path;

wherein the control device includes processing to:

determine the traversing path with a traversing path determining module utilizing point-to-point control with an overlooping function; and in an automatic mode, automatically move the load lifting means along the determined traversing path using an automatic traversing control module; and wherein the point-to-point control with the overlooping function is configured to operate such that when the load lifting means reaches an overlooping area of a target point, the load lifting means is directed to a next target point just before reaching the target point, wherein overlooping is begun when an axis of the load lifting means reaches a region defined by a sphere around the target point.

2. The crane according to claim 1, wherein the traversing path determining module includes a path control module for determining a continuous, mathematically defined path between two target points.

3. The crane according to claim 1, wherein the traversing path determining module is configured to take into account working range limitations, and determine the traversing path around working range limitations.

4. The crane according to claim 1, wherein the load lifting means is mounted on a hoisting cable; and wherein the driving devices including several crane elements, one of the crane elements being the load lifting means.

5. The crane according to claim 4, wherein the control device comprises a position sensor system that is configured to detect the load lifting means relative to a fixed world coordinate system, and/or is configured to position the load lifting means relative to a fixed world coordinate system.

6. The crane according to claim 4 further comprising a sway damping device configured to detect sway of the load lifting means as it is moved through the traversing path;

wherein, in the automatic mode, the automatic traversing control module takes into account detected sway from the sway damping device and the control device controls an actuation of the driving devices to dampen the sway of the load lifting means as it moves along the traversing path.

7. The crane according to claim 6, wherein the sway damping device includes a detection device for detecting a deflection of the hoisting cable, and/or the load lifting means with respect to a vertical axis through a suspension point of the hoisting cable;

wherein the automatic traversing control module actuates one or more of the driving devices based on the detected deflection and/or a diagonal pull signal of the detection device.

8. The crane according to claim 6, wherein the sway damping device includes:

a determination means for determining deformations and/or movements of structural components of the crane as a result of dynamic loads; and a control module configured to take into account the determined deformations and/or movements of the structural components, as determined by the determination means, as a result of dynamic loads influencing the actuation of the one or more driving devices.

9. The crane according to claim 8, wherein the structural components of the crane comprise a tower and/or a boom; and wherein the determination means is configured to determine deformations and/or loads of the tower and/or the boom as a result of dynamic loads.

10. The crane according to claim 8, wherein the structural components of the crane comprise drive train parts; and wherein the determination means is configured to determine deformations and/or movements of the drive train parts as a result of dynamic loads.

11. The crane according to claim 8, wherein the determination means includes an estimating device for estimating the deformations and/or movements of the structural components as a result of dynamic loads based on digital data of a data model describing a crane structure.

12. The crane according to claim 8, wherein the determination means includes a calculation unit for calculating structural deformations and resulting movements of structural components with reference to a stored calculation model, the stored calculation model based on control commands entered at a control stand.

13. The crane according to claim 8, wherein the determination means includes a sensor system for detecting the deformations and/or movements of the structural components.

14. The crane according to claim 13, wherein the sensor system includes one or more of:

an inclination sensor for detecting tower inclinations;

an acceleration sensor for detecting tower velocities;

a rotational speed sensor for detecting a rotational speed of a boom;

an acceleration sensor for detecting an acceleration of a boom;

a pitching movement sensor for detecting pitching movements of a boom;

a cable speed sensor for detecting cable speeds of the hoisting cable; or a cable acceleration sensor for detecting cable accelerations of the hoisting cable.

15. The crane according to claim 8, wherein the sway damping device includes a filter and/or observer device for influencing actuating variables of drive regulators;

wherein the regulator actuating variables actuate the driving devices;

wherein the filter and/or observer device is configured to receive, as a first set of input variables:

the regulator actuating variables of the drive regulators; and at least one of:

detected and/or estimated movements of crane elements; or deformations and/or movements of structural components;

wherein the at least one detected and/or estimated movements of crane elements, or deformations and/or movements of structural components, occur as a result of dynamic loads;

wherein the filter and/or observer device is configured to influence the regulator actuating variables based on dynamically induced movements of the crane elements; and wherein the regulator actuating variables are obtained for particular actuating variables and/or deformations of structural components.

16. The crane according to claim 15, wherein the filter and/or observer device is configured as a Kalman filter.

17. The crane according to claim 16, wherein the determination means includes:

an estimating device for estimating the deformations and/or movements of the structural components as a result of dynamic loads based on digital data of a data model describing a crane structure;

a calculation unit for calculating structural deformations and resulting movements of structural components with reference to a stored calculation model, the stored calculation model based on control commands entered at a control stand; and a sensor system for detecting the deformations and/or movements of the structural components;

wherein the determination means is configured to output as output variables one or more of the estimated deformations and/or movements from the estimating device, the structural deformations and resulting movements of structural components from the calculation unit, and the deformations and/or movements of the structural components from the sensor system;

combining:

the first set of input variables; and those output variables of the determination means not already included in the first set of input variables to form a second set of input variables;

wherein the filter and/or observer device is configured to receive the second set of input variables;

wherein the second set of input variables characterize the dynamics of the structural components of the crane; and wherein the second set of input variables are implemented in the Kalman filter.

18. The crane according to claim 1, wherein:

in an asynchronous mode, the point-to-point control with the overlooping function is configured to operate asynchronously, wherein overlooping is begun when a last axis of the load lifting means reaches the region defined by the sphere around the target point; and in a synchronous mode, the point-to-point control with the overlooping function is configured to operate synchronously, wherein overlooping is begun when a leading axis of the load lifting means reaches the region defined by the sphere around the target point.

19. The crane according to claim 18, wherein the traversing path is further defined by a plurality of intermediate points between two target points; and wherein through portions of the traversing path that are defined by both target and intermediate points, the point-to-point control with the overlooping function is configured to operate such that when the load lifting means reaches an overlooping area of a point, the load lifting means is directed to a next point just before reaching the point, wherein overlooping is begun when an axis of the load lifting means reaches a region defined by a sphere around the point.

20. The crane according to claim 19, wherein the traversing path determining module is connected to a teach-in device for assistance with determining the traversing path by manually approaching one or more target and intermediate points.

21. The crane according to claim 19, wherein the traversing path determining module is connected to a playback device for assistance with determining the desired traversing path and/or target and intermediate points of the traversing path by manually traversing the load lifting means along at least a portion of the traversing path.

22. The crane according to claim 19, wherein the traversing path determining module includes a multipoint control module for determining the plurality of intermediate points.

23. The crane according to claim 22, wherein the multipoint control module is configured to fix the plurality of intermediate points equidistantly from each other.

24. The crane according to claim 19, wherein the traversing path determining module is connected to an external master computer that has access to a building data model, and provides target and intermediate points for the determination of the traversing path.

25. The crane according to claim 19, wherein the traversing path determining module is connected to an external master computer that:

has access to a building data model including data concerning working range limitations and building contours of various construction phases; and provides target and intermediate target points for the determination of the traversing path;

wherein the external master computer cyclically or continuously provides updated data concerning the working range limitations and/or concerning the building contours of the various construction phases; and wherein the traversing path determining module is configured to take into account the updated data concerning the working range limitations and/or building contours when determining the traversing path.

* * * * *